United States Patent
Roberts, Jr.

(10) Patent No.: US 11,070,513 B2
(45) Date of Patent: Jul. 20, 2021

(54) DNS-BASED METHOD OF TRANSMITTING DATA

(71) Applicant: ZEDLY, INC., Lake Worth, FL (US)

(72) Inventor: Thomas A. Roberts, Jr., Lake Worth, FL (US)

(73) Assignee: Zedly, Inc., Weston, FL (US)

( * ) Notice: Subject to any disclaimer, the term of this patent is extended or adjusted under 35 U.S.C. 154(b) by 0 days.

(21) Appl. No.: 16/016,002

(22) Filed: Jun. 22, 2018

(65) Prior Publication Data

US 2018/0375818 A1    Dec. 27, 2018

Related U.S. Application Data

(60) Provisional application No. 62/524,847, filed on Jun. 26, 2017.

(51) Int. Cl.
*H01L 29/12*    (2006.01)
*H04L 29/12*    (2006.01)
(Continued)

(52) U.S. Cl.
CPC ........ *H04L 61/1511* (2013.01); *H04L 61/305* (2013.01); *H04L 67/02* (2013.01);
(Continued)

(58) Field of Classification Search
CPC ............ H04L 61/1511; H04L 61/1552; H04L 61/609; H04L 63/0227; H04L 63/0236;
(Continued)

(56) References Cited

U.S. PATENT DOCUMENTS

| 8,624,727 B2 | 1/2014 | Saigh et al. |
| 8,738,765 B2 | 5/2014 | Wyatt et al. |

(Continued)

FOREIGN PATENT DOCUMENTS

| WO | 0079727 A2 | 12/2000 |

OTHER PUBLICATIONS

Musa, A. B. M., and Jakob Eriksson. "Tracking unmodified smartphones using wi-fi monitors." Proceedings of the 10th ACM conference on embedded network sensor systems. ACM, 2012.

*Primary Examiner* — Jungwon Chang
(74) *Attorney, Agent, or Firm* — Allen Dyer Doppelt & Gilchrist, PA

(57) ABSTRACT

The DNS-based method of transmitting data provides a telecommunication method for transmitting user-selectable data through the Domain Name System (DNS). Selected data is encoded as an alphanumeric character string on a user device. A uniform resource locator (URL) having a domain part and a host part is generated, where the host part is constructed from the alphanumeric character string. The URL is transmitted from the user device to a local DNS server. The URL is forwarded from the local DNS server to an authoritative DNS server associated with a domain name of the domain part. A set of response bytes, which are responsive to the user-selectable data encoded as the alphanumeric character string of the host part, is generated at the domain and transmitted from the authoritative DNS server to the local DNS server. The set of response bytes are transmitted from the local DNS server to the user device.

13 Claims, 2 Drawing Sheets

(51) Int. Cl.
*H04L 29/08* (2006.01)
*H04W 84/12* (2009.01)
*G06F 16/955* (2019.01)

(52) U.S. Cl.
CPC ...... *G06F 16/9566* (2019.01); *H04L 61/6068* (2013.01); *H04W 84/12* (2013.01)

(58) Field of Classification Search
CPC . H04L 63/0428; H04L 61/304; H04L 61/301; H04L 67/18; H04L 67/10; H04L 67/02; H04L 67/2804; H04L 61/305; H04L 61/6068; H04W 4/025; H04W 84/12; G06F 16/9566
See application file for complete search history.

(56) References Cited

U.S. PATENT DOCUMENTS

| | | | |
|---|---|---|---|
| 8,880,047 | B2 | 11/2014 | Konicek et al. |
| 9,203,840 | B2 | 12/2015 | Spencer et al. |
| 2002/0176579 | A1 | 11/2002 | Deshpande et al. |
| 2003/0009592 | A1* | 1/2003 | Stahura ............ H04L 29/12066 709/245 |
| 2009/0193513 | A1* | 7/2009 | Agarwal ............. H04L 63/0227 726/15 |
| 2012/0023153 | A1* | 1/2012 | Karasaridis ............. H04L 67/18 709/203 |
| 2012/0113893 | A1* | 5/2012 | Damola .............. H04L 12/4633 370/328 |
| 2013/0217416 | A1* | 8/2013 | Matthews, III ....... H04W 4/029 455/456.2 |
| 2015/0199357 | A1* | 7/2015 | Hwang ................. G06F 16/954 707/748 |
| 2015/0365393 | A1* | 12/2015 | Shyamsunder ......... H04L 67/10 726/4 |
| 2016/0007161 | A1 | 1/2016 | Filali |
| 2016/0316006 | A1* | 10/2016 | Zhang ................... H04L 61/304 |
| 2016/0352840 | A1* | 12/2016 | Negron .................. H04L 67/02 |
| 2017/0111473 | A1* | 4/2017 | Amiga ................ H04L 61/1511 |

* cited by examiner

DNS-BASED METHOD OF TRANSMITTING DATA

CROSS-REFERENCE TO RELATED APPLICATION

This application claims the benefit of U.S. Provisional Patent Application No. 62/524,847, filed on Jun. 26, 2017.

BACKGROUND

1. Field

The disclosure of the present patent application relates to telecommunication, and particularly to a method of transmitting user-selectable data through the Domain Name System (DNS).

2. Description of the Related Art

The Domain Name System (DNS) is a hierarchical decentralized naming system for computers, services or other resources connected to the Internet or a private network. The DNS associates various information with domain names assigned to each of the participating entities. Most prominently, the DNS translates more readily memorized domain names to the numerical IP addresses needed for locating and identifying computer services and devices with the underlying network protocols. By providing a worldwide, distributed directory service, the Domain Name System is an essential component of the functionality on the Internet, which has been in use since 1985.

The DNS delegates the responsibility of assigning domain names and mapping those names to Internet resources by designating authoritative name servers for each domain. Network administrators may delegate authority over subdomains of their allocated name space to other name servers. This mechanism provides distributed and fault tolerant service and was designed to avoid a single large central database. The Internet maintains two principal namespaces: the domain name hierarchy and the Internet Protocol (IP) address spaces. The Domain Name System maintains the domain name hierarchy and provides translation services between it and the address spaces. Internet name servers and a communication protocol implement the Domain Name System. A DNS name server is a server that stores the DNS records for a domain; a DNS name server responds with answers to queries against its database.

An often-used analogy to explain the Domain Name System is that it serves as the phone book for the Internet by translating human-friendly computer hostnames into IP addresses. For example, the domain name www.example.com translates to the exemplary addresses 93.184.216.119 (IPv4) and 2606:2800:220:6d:26bf:1447:1097:aa7 (IPv6). Unlike a phone book, however, the DNS can be quickly updated, allowing a service's location on the network to change without affecting the end users, who continue to use the same hostname. Users take advantage of this when they use meaningful Uniform Resource Locators (URLs) and e-mail addresses without having to know how the computer actually locates the services.

In the above example, "example.com" is referred to as the "domain" part of the URL address. If the DNS server does not have a corresponding IP address for the requested URL, the request is forwarded to an authoritative DNS server for that domain name; if, in this example, the DNS server receiving the request for the domain name www.example.com does not have the corresponding IP address, the request is then forwarded to the authoritative DNS server for that domain name, which is a DNS server owned by the owner of example.com. Thus, the request is sent from the initial, local DNS server to a remote DNS server associated with the domain which, in this example, is example.com. The authoritative DNS server associated with example.com will then translate the request into an IP address, and this IP address will be forwarded back to the local DNS server, and then the user will receive the reply. The local DNS server may decide to cache or store this information for a short time so that the answer can be provided if a similar request is received. In general, an authoritative name server is a name server that only gives answers to DNS queries from data that has been configured by an original source, for example, the domain administrator or by dynamic DNS methods, in contrast to answers obtained via a query to another name server that only maintains a cache of data.

A URL is often appended with a "host" part. For example, rather than the exemplary URL www.example.com, the URL may be www.corporate.example.com. In this example, "example.com" remains the domain part of the URL, and "www.corporate" is considered the host part. In the above exemplary process, if the local DNS server cannot translate www.corporate.example.com into an IP address, then the request is still forwarded to the authoritative DNS server associated with the domain; i.e., the authoritative DNS server associated with example.com, regardless of the "www.corporate" host part.

The DNS process, as described above, is highly automated and is part of the backbone of the modern Internet, thus it is not only automatic but extremely fast, as it operates on a fundamental level of Internet communication. In addition to speed, due to its constant usage over the past few decades, the DNS has been constantly updated and improved, particularly in terms of both privacy and security measures. Given the speed, privacy and security associated with the DNS, it would obviously be desirable to be able to take advantage of this method of data transfer for user-selectable data packets; i.e., for data exchange beyond simple name and address translations. Thus, a DNS-based method of transmitting data solving the aforementioned problems is desired.

SUMMARY

The DNS-based method of transmitting data provides a telecommunication method for transmitting user-selectable data through the Domain Name System (DNS). The DNS-based method of transmitting data provides a simple authenticated messaging system. Selected data is first encoded as an alphanumeric character string on a user device. As a non-limiting example, the user device may be a mobile device, such as a smartphone, a laptop computer, a global positioning system (GPS) tracking device or the like, and, as a further non-limiting example, the mobile device may be mounted in, or transported in, a vehicle. In these examples, the user-selectable data may include a timestamp, a device and/or user account identifier, a battery level indicator, GPS location coordinates, and combinations thereof.

A uniform resource locator (URL) having a domain part and a host part is then generated, where the host part is constructed from the permissible alphanumeric character string used by the DNS. The URL is transmitted from the user device to a local DNS server. The URL is forwarded from the local DNS server to an authoritative DNS server associated with a domain name of the domain part; e.g., the owner of the domain name. Since the host part of the message is unique, it will not be cached and/or stored and, thus, will be forwarded to the authoritative DNS server associated with a domain name of the domain part. A set of response bytes, which are dynamically created and are responsive to the user-selectable data encoded as the alphanumeric character string of the host part, is generated at the domain and transmitted back from the authoritative DNS server to the local DNS server. The set of response bytes is then transmitted from the local DNS server to the user device.

As noted above, the user device may be a mobile device, which may be further mounted in, or carried in, a vehicle. As the mobile device moves, the device may scan for an open local wireless network. As a non-limiting example, the mobile device may periodically perform a scan to detect the nearest open Wi-Fi® enabled network. In this example, if an open local wireless network connection can be established, then the URL is transmitted from the user device to the DNS server associated with the open local wireless network. The set of response bytes is then transmitted from the local DNS server to the user device through the open local wireless network connection. If an initial open local wireless network connection cannot be established, then scanning is performed periodically, over a set time interval, until a connection can be established.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The DNS-based method of transmitting data provides a telecommunication method for transmitting user-selectable data through the Domain Name System (DNS). Selected data is first encoded as an alphanumeric character string on a user device. In the simplified, non-limiting example of FIG. 1, the user device may is a mobile device 10, such as a smartphone, a laptop computer, a global positioning system (GPS) tracking device or the like, which, as a further non-limiting example, is mounted in, or transported in, a vehicle V. In these examples, the user-selectable data may include, for example, a timestamp, a device and/or user account identifier, a battery level indicator, GPS location coordinates, and combinations thereof. It should be understood that location information may be provided by any suitable type of locating system, such as the global positioning system (GPS), a list of BSSID addresses associated with Wi-Fi® stations obtained in a scan, which can be used to determine location, or the like.

A uniform resource locator (URL) having a domain part and a host part is then generated, where the host part is constructed from the alphanumeric character string. As a non-limiting example, provided for purposes of illustration only, a URL generated by mobile device 10 may be www.GZIDC130BDDCA-CGXCDDHZYIAXCAE-GZFA.example.com. In this exemplary URL, example.com is the domain part and www.GZIDC130BDDCA-CGXCD-DHZYIAXCAEGZFA is the host part. In this example, a timestamp may be encoded as "GZIDC1", an identifier associated with the device (e.g., a serial number) or a user account number may be encoded as "30BDDC", a battery level associated with the device may be encoded as "X", and GPS coordinates may be encoded as "DHZYIAXCAE-GZFA". Each of these alphanumeric encryptions are concatenated together to form the encoded alphanumeric string "GZIDC130BDDCA-CGXCDDHZYIAXCAEGZFA".

Figure 1:
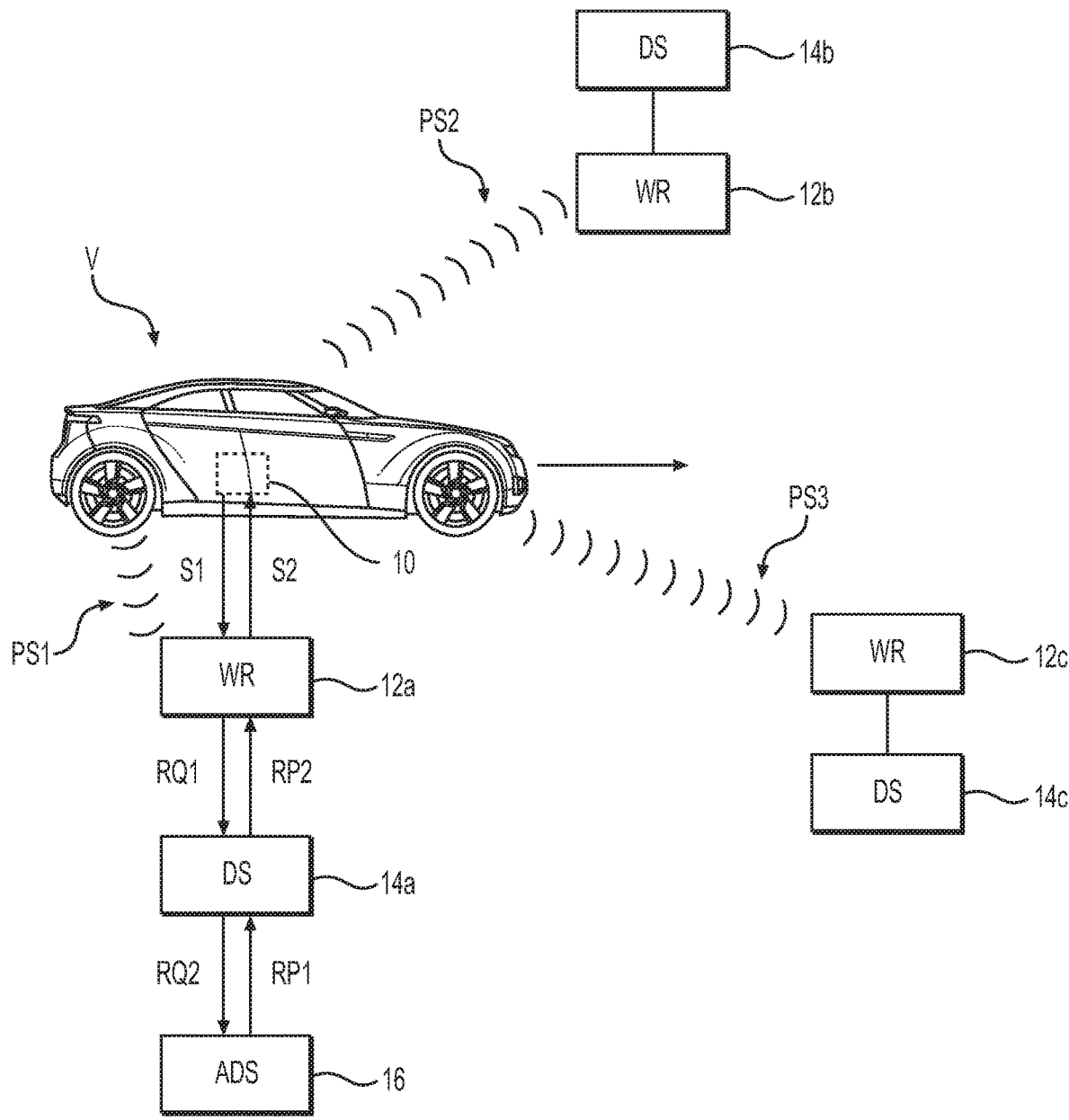
FIG. 1 diagrammatically illustrates implementation of a DNS-based method of transmitting data.

The URL is transmitted from the user device 10 to a local DNS server. As noted above, the user device may be a mobile device 10, which may be further mounted in, or carried in, a vehicle V. As the mobile device 10 moves, the device 10 may scan for an open local wireless network. As a non-limiting example, the mobile device may periodically scan to detect the nearest open Wi-Fi® enabled network. In the simplified example of FIG. 1, pinging or polling signals PS1, PS2 and PS3 are shown being transmitted from user device 10 to wireless routers (WRs) 12a, 12b, 12c, respectively. It should be understood that FIG. 1 is simplified for purposes of illustration and clarity. In the example of FIG. 1, wireless router 12a is the nearest wireless router and/or the wireless router with the strongest signal and/or the only wireless router which provides an open network connection. Each of the wireless routers 12a, 12b, 12c has a DNS server (DS) 14a, 14b, 14c, respectively, associated therewith. In FIG. 1, an open local wireless network connection is established between device 10 and wireless router 12a. The URL is transmitted from the user device 10 to DNS server 14a through wireless router 12a (shown as request RQ1 in FIG. 1).

In FIG. 1, the initial transmission from user device 10 is represented by signal S1. In the event that an initial open local wireless network connection cannot be established, then scanning is performed periodically, over a set time interval, until a connection can be established. The encoding of the data into the host part provides a first level of security for transmission of the data. Additionally, the host part also contains an authentication stamp using an industry standard type of message authentication, thus preventing the transmitted data from being tampered with or altered in any way.

The URL is forwarded from the local DNS server 14a to an authoritative DNS server (ADS) 16 associated with a domain name of the domain part; i.e., in the above example, the URL is forwarded to ADS 16, which is a server owned by, or associated with, the owners and/or operators of the domain example.com. This forwarded request is shown as request RQ2 in FIG. 1. In the conventional DNS, the URL is simply translated by the authoritative DNS server into an IP address response, and this IP address is transmitted back to the original requester. A typical IP address is in four byte form; e.g. 80.100.42.07. In the DNS-based method of transmitting data, although authoritative DNS server 16 receives a URL, as in conventional DNS, the host part of the URL is unique and, thus, cannot be cached, so the message is sure to be forwarded to the authoritative DNS server 16. The unique host message is then checked for authenticity and decoded into the original user selected data. In the above example, the host part "GZIDC130BDDCA-CGXCD-DHZYIAXCAEGZFA" is decoded into the transmitted timestamp, account associated with the device, battery level and GPS coordinates. The domain part of the URL is used to have the encoded URL automatically and securely transmitted to the desired domain.

Since local DNS server 14a expects to receive a conventional IP address from authoritative DNS server 16, a response from the domain (i.e., responsive to the data which was transmitted through the encoded URL) is sent in the same format as a conventional IP address; i.e., the response is encoded into four numerical bytes, and this encoded response (reply RP1 in FIG. 1) is transmitted back to local DNS server 14a. As a non-limiting example, a code of "80.111.23.50", which is in the same four byte numeric form as a conventional IP address, may be transmitted to local DNS server 14a, as reply signal RP1, and then forwarded to wireless router 12a as reply signal 12a, and then finally transmitted back to user device 10 as signal S2. In this example, the user device 10 can then decrypt the received four byte code "80.111.23.50" into a corresponding response, such as, for example, "Lost device. Please provide more frequent GPS location data requests" or "Everything is OK". This example demonstrates a lightweight, two-way, authenticated messaging system using the most widespread and fastest protocol used on the Internet; i.e., the DNS.

Figure 2:
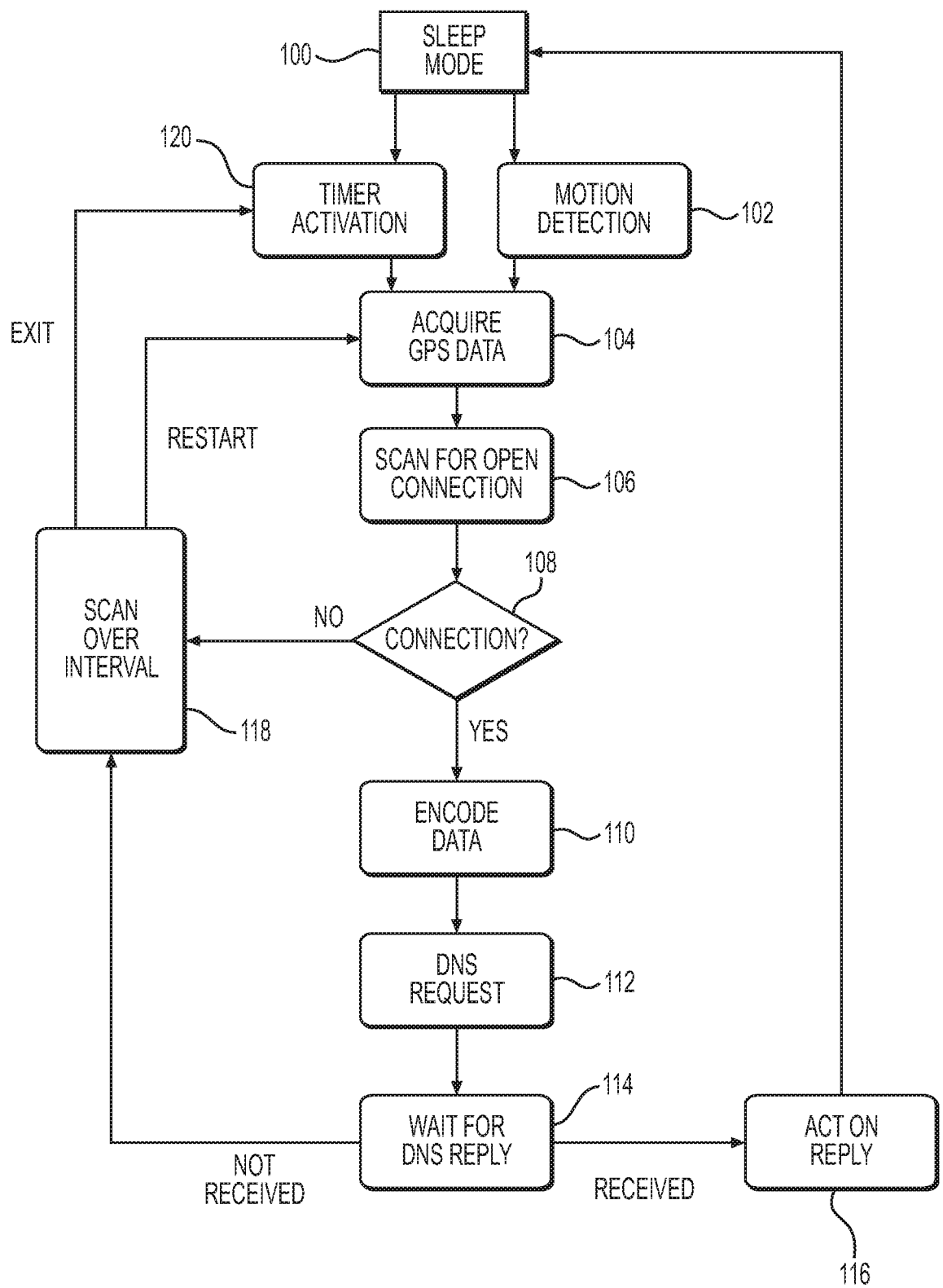
FIG. 2 is a block diagram showing method steps of the DNS-based method of transmitting data.

As shown in FIG. 2, mobile device 10 may begin in a sleep or low power mode (step 100). Mobile device 10 may be "awakened" into a full power mode by a pre-set action. As a non-limiting example of such a pre-set action, device 10 may be awakened by detection of motion of mobile device 10 (step 102) or activation of a timer (step 120). Upon activation, the user-selectable data is gathered, such as the GPS coordinates and the like (step 104). Signals are then sent out to scan for an open local wireless network (step 106). If a connection is made, then the selected data is encoded as the alphanumeric character string to be used as the host part of the URL (steps 108 and 110). The URL is then constructed, by adding the domain part to the host part, and the URL is transmitted in a manner similar to a conventional DNS request (step 112). Mobile device 10 waits for the four byte encoded response (i.e., the response encoded in the same format as a conventional IP address) at step 114 and, if the response is received, then mobile device 10 acts upon the information contained within the response (step 116). The mobile device 10 then returns to the sleep or low power mode of step 100 to be awakened again and repeat the process.

If, however, at step 114 no response is received, then mobile device 10 begins scanning for a new open local wireless network connection at step 118. Similarly, if at step 108, no initial connection is made, then scanning for a new open local wireless network connection begins at step 118. Here, scanning can be performed over a pre-determined interval. For example, at step 118, mobile device 10 can scan for a new open local wireless network connection every 5 seconds, repeating the scan until a network connection is found or until a pre-determined number of attempts have been made. The process can then either be restarted or, if not connection can be established, the process can be exited, returning to step 120 so that later attempts can be made.

As noted above, encoding of the data into the host part of the URL provides a first level of security for transmission of the selected data. Additionally, because the DNS is used as the transmission medium, the data is transmitted using message authentication, thus preventing the transmitted data from being tampered with or altered in any way. In addition to this security, the DNS-based method of transmitting data is a fast transmission method, since the DNS uses the User Datagram Protocol (UDP). With UDP, computer applications can send messages, in this case referred to as "datagrams", to other hosts on an Internet Protocol (IP) network. Prior communications are not required in order to set up communication channels or data paths. This is compared to other methods of sending messages through the Internet, which typically use the Transmission Control Protocol (TCP). TCP requires a two-way "handshake" between devices before any data is sent. By taking advantage of the DNS's usage of UDP, the DNS-based method of transmitting data is much faster than conventional methods of transmitting data over the Internet, such as email, text messages and the like, and further provides inherent security.

It is to be understood that the DNS-based method of transmitting data is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A DNS-based method of transmitting data, comprising the steps of:
    encoding selected data as an alphanumeric character string on a user device;
    generating a uniform resource locator having a first part and a second part, wherein the first part is constructed from the alphanumeric character string and wherein the second part is a unique part configured to prevent itself from being stored;
    transmitting the uniform resource locator from the user device to a local domain name system server;
    forwarding the uniform resource locator from the local domain name system server to an authoritative domain name system server associated with a domain name of the second part;
    authenticating the domain name of the second part,
    decoding the domain name of the second part into the original selected data upon a successful authentication,
    transmitting a set of response bytes from the authoritative domain name system server to the local domain name system server; the set of response bytes being dynamically created and responsive to the encoded selected data; and
    transmitting the set of response bytes from the local domain name system server to the user device.

2. The DNS-based method of transmitting data as recited in claim 1, further comprising the step of scanning for an open local wireless network.

3. The DNS-based method of transmitting data as recited in claim 2, wherein the step of transmitting the uniform resource locator from the user device to the local domain name system server comprises transmitting the uniform resource locator from the user device to the local domain name system server through the open local wireless network.

4. The DNS-based method of transmitting data as recited in claim 3, wherein the step of transmitting the set of response bytes from the local domain name system server to the user device comprises transmitting the set of response bytes from the local domain name system server to the user device through the open local wireless network.

5. The DNS-based method of transmitting data as recited in claim 1, wherein the step of encoding the selected data as the alphanumeric character string on the user device comprises encoding data selected from the group consisting of a timestamp, a device identifier, a battery level indicator, GPS location coordinates, and combinations thereof.

6. A DNS-based method of transmitting data, comprising the steps of:
encoding selected data as an alphanumeric character string on a user device;
generating a uniform resource locator having a first part and a second part, wherein the first part is constructed from the alphanumeric character string and wherein the second part is a unique part configured to prevent itself from being stored;
scanning for an open local wireless network;
transmitting the uniform resource locator from the user device to a local domain name system server through the open local wireless network;
forwarding the uniform resource locator from the local domain name system server to an authoritative domain name system server associated with a domain name of the second part;
authenticating the domain name of the second part,
decoding the domain name of the second part into the original selected data upon a successful authentication,
transmitting a set of response bytes from the authoritative domain name system server to the local domain name system server; the set of response bytes being dynamically created and responsive to the encoded selected data; and
transmitting the set of response bytes from the local domain name system server to the user device.

7. The DNS-based method of transmitting data as recited in claim 6, wherein the step of encoding the selected data as the alphanumeric character string on the user device comprises encoding data selected from the group consisting of a timestamp, a device identifier, a battery level indicator, GPA location coordinates, and combinations thereof.

8. The DNS-based method of transmitting data as recited in claim 6, wherein the step of transmitting the set of response bytes from the local domain name system server to the user device comprises transmitting the set of response bytes from the local domain name system server to the user device through the open local wireless network.

9. A DNS-based method of transmitting data, comprising the steps of:
encoding selected data as an alphanumeric character string on a user device;
generating a uniform resource locator having a first part and a second part, wherein the first part is constructed from the alphanumeric character string and wherein the second part is a unique part configured to prevent itself from being stored;
scanning for an open local wireless network;
transmitting the uniform resource locator from the user device to a local domain name system server through the open local wireless network;
forwarding the uniform resource locator from the local domain name system server to an authoritative domain name system server associated with a domain name of the second part;
authenticating the domain name of the second part,
decoding the domain name of the second part into the original selected data upon a successful authentication,
transmitting a set of response bytes form the authoritative domain name system server to the local domain name system server; the set of response bytes being dynamically created and responsive to the encoded selected data; and
transmitting the set of response bytes from the local domain name system server to the user device through the open local wireless network.

10. The DNS-based method of transmitting data as recited in claim 9, wherein the step of encoding the selected data as the alphanumeric character string on the user device comprises encoding data selected from the group consisting of a timestamp, a device identifier, a battery level indicator, GPS location coordinates, and combinations thereof.

11. The DNS-based method of transmitting data as recited in claim 1, wherein transmitting the uniform resource locator from the user device to a local domain name system server comprises transmitting the uniform resource locator from the user device to a local domain name system server implementing a User Datagram Protocol (UDP).

12. The DNS-based method of transmitting data as recited in claim 1, wherein transmitting a set of response bytes from the authoritative domain name system server to the local domain name system server comprises transmitting a set of response bytes from the authoritative domain name system server to the local domain name system server implementing a User Datagram Protocol (UDP).

13. The DNS-based method of transmitting data as recited in claim 1, wherein transmitting the set of response bytes from the local domain name system server to the user device comprises transmitting the set of response bytes from the local domain name system server to the user device implementing a User Datagram Protocol (UDP).

* * * * *